(12) United States Patent
Won et al.

(10) Patent No.: US 11,956,664 B2
(45) Date of Patent: *Apr. 9, 2024

(54) DISTINGUISHING BETWEEN QUALITY OF SERVICE MANAGEMENT FRAMES (QMFS) AND NON-QMFS IN PROTOCOL VERSION 1 (PV1)

(71) Applicant: NEWRACOM, Inc., Irvine, CA (US)

(72) Inventors: Junyoun Won, Irvine, CA (US); Yujin Noh, Irvine, CA (US); Joonsoo Lee, Seoul (KR); Hyun Sik Jung, Seoul (KR); Hyungu Park, Irvine, CA (US)

(73) Assignee: NEWRACOM, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,285

(22) Filed: Mar. 6, 2023

(65) Prior Publication Data

US 2023/0217299 A1    Jul. 6, 2023

Related U.S. Application Data

(63) Continuation of application No. 17/389,102, filed on Jul. 29, 2021, now Pat. No. 11,627,487.

(Continued)

(51) Int. Cl.
*H04W 28/02* (2009.01)
*H04L 47/34* (2022.01)

(Continued)

(52) U.S. Cl.
CPC ......... *H04W 28/0268* (2013.01); *H04L 47/34* (2013.01); *H04L 69/04* (2013.01); *H04L 69/22* (2013.01); *H04W 28/06* (2013.01)

(58) Field of Classification Search
CPC .. H04W 28/0268; H04W 28/06; H04L 47/34; H04L 69/22; H04L 69/324; H04L 67/12; H04L 69/04; H04L 45/66
See application file for complete search history.

(56) References Cited

U.S. PATENT DOCUMENTS

| 11,627,487 B2 * | 4/2023 | Won .................. H04L 69/22 370/235 |
| 2013/0173924 A1 | 7/2013 | Kim et al. |

(Continued)

OTHER PUBLICATIONS

IEEE Std 802.11-2016: "Part 11: Wireless LAN Medium Access Control (MAC) and Physical Layer (PHY) Specifications," IEEE Standard for Information technology-Telecommunicationsand information exchange between systems, Local and metropolitan area networks-Specific requirements, Dec. 7, 2016, 3534 pages.

(Continued)

*Primary Examiner* — Mandish K Randhawa
(74) *Attorney, Agent, or Firm* — Nicholson, De Vos, Webster & Elliott, LLP

(57) ABSTRACT

A method by a wireless transmitting device is disclosed for indicating a partial traffic identifier (PTID) or an access category index (ACI) in a header compression element. The method includes generating a frame that includes the header compression element, wherein the header compression element includes a first subfield that is for indicating a PTID of a quality of service (QoS) data frame or an ACI of a QoS management frame and a second subfield indicating whether the first subfield indicates the PTID of the QoS data frame or the ACI of the QoS management frame. The method further includes transmitting the frame through a wireless medium.

19 Claims, 22 Drawing Sheets

Related U.S. Application Data

(60) Provisional application No. 63/059,773, filed on Jul. 31, 2020.

(51) Int. Cl.
*H04L 69/04* (2022.01)
*H04L 69/22* (2022.01)
*H04W 28/06* (2009.01)

(56) References Cited

U.S. PATENT DOCUMENTS

| | | |
|---|---|---|
| 2014/0105098 A1 | 4/2014 | Chu et al. |
| 2015/0098570 A1* | 4/2015 | Wentink .............. H04W 12/041 370/329 |
| 2016/0057703 A1 | 2/2016 | Benoit et al. |
| 2016/0337783 A1 | 11/2016 | Seok |
| 2019/0007941 A1 | 1/2019 | Cavalcanti et al. |

OTHER PUBLICATIONS

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 Ghz," IEEE Standard for Information technology-Telecommunications and information exchange between systems, Local and metropolitan area networks-Specific requirements, Dec. 18, 2013, 425 pages.

IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology-Telecommunications and information exchange between systems, Local and metropolitan area networks-Specific requirements, 2016, 594 pages.

Non-Final Office Action, U.S. Appl. No. 17/389,102, dated Jul. 20, 2022, 11 pages.

Notice of Allowance, U.S. Appl. No. 17/389,102, dated Jan. 4, 2023, 11 pages.

\* cited by examiner

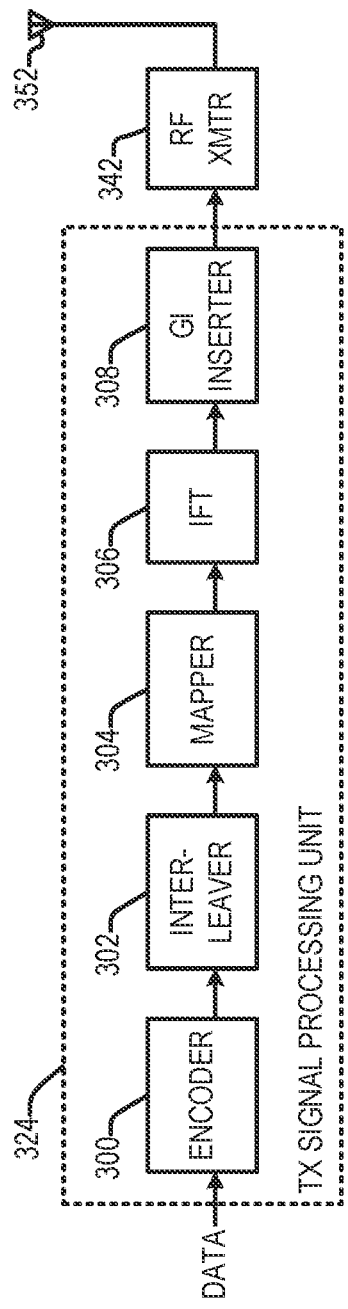
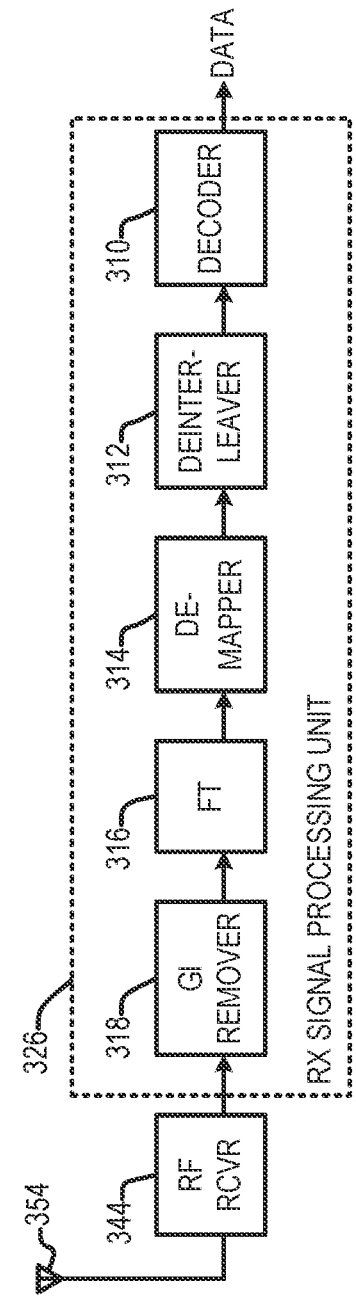

| | |
|---|---|
| FREQUENCY BAND | LICENSE-EXEMPT BANDS BELOW 1 GHZ, EXCLUDING THE TV WHITE SPACES |
| CHANNEL WIDTH | 1/2/4/8/16 MHZ |
| MODULATION SCHEMES | BPSK, QPSK, 16-QAM, 64-QAM, 256-QAM |
| MAXIMUM NUMBER OF SPATIAL STREAMS | FOUR SPATIAL STREAMS |
| RANGE | UP TO 1KM (OUTDOOR) |
| END NODE TRANSMIT POWER | DEPENDENT ON REGIONAL REGULATIONS (FROM 1 MW TO 1 W) |
| PACKET SIZE | UP TO 7,991 BYTES (WITHOUT AGGREGATION) UP TO 65,535 BYTES (WITH AGGREGATION) |
| DATA RATE | 150 KB/S (1 MHZ CHANNEL BANDWIDTH, 1 SPATIAL STREAM, BPSK, 1/2 CODING RATE, REPETITION CODING) TO 347 MB/S (16 MHZ CHANNEL BANDWIDTH, 4 SPATIAL STREAMS, 256 QAM, 5/6 CODING RATE) |
| NUMBER OF STATIONS | UP TO 6000 |
| LOCATION | INDOOR AND OUTDOOR |
| TRAFFIC TYPE | PERIODIC PACKET TRANSMISSION EVERY FEW TO TENS MINUTES |

FIG. 6

TABLE OF PV1 MANAGEMENT FRAME SUBTYPES

| PTID/SUBTYPE VALUE B7 B6 B5 | SUBTYPE DESCRIPTION |
|---|---|
| 000 | ACTION |
| 001 | ACTION NO ACK |
| 010 | PV1 PROBE RESPONSE |
| 011 | RESOURCE ALLOCATION |
| 100-111 | RESERVED |

FIG. 12

TABLE OF PV1 MANAGEMENT FRAME SUBTYPES (MODIFIED)

| PTID/SUBTYPE VALUE B7 B6 B5 | SUBTYPE DESCRIPTION |
|---|---|
| 000 | ACTION (NON-QMF) |
| 001 | ACTION NO ACK (NON-QMF) |
| 010 | PV1 PROBE RESPONSE |
| 011 | RESOURCE ALLOCATION |
| 100 | ACTION (QMF) |
| 101 | ACTION NO ACK (QMF) |
| 110-111 | RESERVED |

FIG. 13

TABLE OF UP-TO-AC MAPPINGS

| PRIORITY | UP (SAME AS IEEE 802.1D USER PRIORITY) | UP IEEE 802.1D DESIGNATION | AC | TRANSMIT QUEUE (DOT11ALTERNATEEDCA ACTIVATED FALSE OR NOT PRESENT) | TRANSMIT QUEUE (DOT11ALTERNATEEDCA ACTIVATED TRUE) | DESIGNATION |
|---|---|---|---|---|---|---|
| LOWEST | 1 | BK | AC_BK | BK | BK | BACKGROUND |
| ↓ | 2 | — | AC_BK | BK | BK | BACKGROUND |
|  | 0 | BE | AC_BE | BE | BE | BEST EFFORT |
|  | 3 | EE | AC_BE | BE | BE | BEST EFFORT |
|  | 4 | CL | AC_VI | VI | A_VI | VIDEO (ALTERNATE) |
|  | 5 | VI | AC_VI | VI | VI | VIDEO (PRIMARY) |
|  | 6 | VO | AC_VO | VO | VO | VIDEO (PRIMARY) |
| HIGHEST | 7 | NC | AC_VO | VO | A_VO | VIDEO (ALTERNATE) |

FIG. 15

TABLE OF ACI-TO-AC CODING

| ACI | AC | DESCRIPTION |
|---|---|---|
| 0 | AC_BE | BEST EFFORT |
| 1 | AC_BK | BACKGROUND |
| 2 | AC_VI | VIDEO |
| 3 | AC_VO | VOICE |

FIG. 16

TABLE OF TRANSMITTER SEQUENCE NUMBER SPACES

| Sequence number space identifier | Sequence number space | Applies to | Status | Multiplicity | Transmitter requirements |
|---|---|---|---|---|---|
| SNS1 | Baseline | A STA transmitting a frame that is not covered by any of the other sequence number spaces. | Mandatory | Single Instance | TR1 |
| SNS2 | Individually addressed QoS Data | A STA transmitting an individually addressed QoS Data frame, excluding SNS5 | Mandatory | Indexed by <Address 1, TID> | |
| SNS3 | Time Priority Management | A QoS STA transmitting a Time Priority Management frame | Optional | Indexed by <Address 1, TID> | |
| SNS4 | QMF | A QMF STA transmitting a QMF | Mandatory | Indexed by <Address 1, AC> | TR2 |
| SNS5 | QoS (+)Null | A STA transmitting a QoS (+)Null frame | Mandatory | None | TR3 |
| (11ah)SNS6 | Individually addressed PV1 Data frame | A STA operating as an S1G STA transmitting a PV1 Data frame | Mandatory | Indexed by <STA MAC Address identified by Address 1, PTID> | |
| (11ah)SNS7 | Individually addressed PV1 Management frame | A STA operating as an S1G STA transmitting a PV1 Management frame | Mandatory | Indexed by <STA MAC Address identified by Address 1> | |

TR1: A transmitting STA should cache the last used sequence number per RA for frames that are assigned sequence numbers from this sequence number space. The STA should check that the successively assigned sequence numbers for frames transmitted to a single RA do not have the same value as is found in the cache for that RA. If the check fails the STA should increment the counter by 2, rather than 1.

TR2: The STA shall assign the sequence number from one modulo 1024 counter per <Address 1, AC> tuple starting at 0 and incrementing by 1 for each MMPDU carried in one or more QMFs with Address 1 and ACI fields matching the <Address 1, AC> tuple values corresponding to that counter.

TR3: Sequence numbers for transmitted QoS (+)Null frames may be set to any value.

FIG. 17

| B0 | B2 | B3 |
|---|---|---|
| PTID/ACI 1802 | | MANAGEMENT 1804 |

| Sequence number space identifier | Sequence number space | Applies to | Status | Multiplicity | Transmitter requirements |
|---|---|---|---|---|---|
| SNS4 | QMF for PV0 | A QMF STA transmitting a PV0 QMF | Mandatory | Indexed by <Address 1, AC> | TR2 |
| SNS8 | QMF for PV1 | A QMF STA transmitting a PV1 QMF | Mandatory | Indexed by <STA MAC Address identified by Address 1, AC> | TR2 |

TABLE OF RECEIVER CACHES

| Receiver cache identifier | Cache name | Applies to | Status | Multiplicity / Cache size | Receiver requirements |
|---|---|---|---|---|---|
| RC1 | Not QoS Data | A STA receiving frames (individually or group addressed) that are not QoS Data, excluding if supported: RC4 RC5 RC6 RC7 RC8 RC10 | Mandatory | Indexed by: <Address 2, sequence number, fragment number>. At least the most recent cache entry per <Address 2>. | RR1 RR2 RR5 |
| RC2 | QoS Data | A STA receiving an (individually or group addressed) QoS Data frame, excluding RC3, and if supported: RC7, RC8, RC9, and RC10 | Mandatory | Indexed by: <Address 2, TID, sequence number, fragment number>. At least the most recent cache entry per <Address 2, TID> pair in this cache. | RR1 RR5 |
| RC3 | QoS (+)Null | A QoS STA receiving a QoS (+)Null frame | Mandatory | None | RR4 |
| RC4 | Non-time priority Management | A STA receiving an individually addressed non-time priority Management frame, excluding RC6 if RC6 is supported | Recommended | Indexed by: <Address 2, sequence number, fragment number> At least the most recent cache entry per <Address 2> value. | RR1 RR2 RR5 |
| RC5 | Time priority Management | A STA receiving an individually addressed time priority Management frame | Supported if RC4 is supported; otherwise not supported | Indexed by: <Address 2, sequence number, fragment number>. At least the most recent cache entry per <Address 2> value. | RR5 |

TABLE OF RECEIVER CACHES

| Receiver cache identifier | Cache name | Applies to | Status | Multiplicity / Cache size | Receiver requirements |
|---|---|---|---|---|---|
| RC6 | QMFs | A STA receiving an individually addressed QMF | Mandatory | Indexed by: <Address 2, AC, sequence number, fragment number><br><br>The most recent cache entry per <Address 2, AC, sequence-number, fragment-number>. | RR2<br>RR3<br>RR5 |
| RC7 | Nonmesh GCR | A nonmesh STA receiving a group addressed frame subject to a GCR agreement. | Mandatory | Indexed by: <DA, sequence number><br><br>One cache entry per <DA, sequence-number> tuple for each group address subject to a GCR agreement. | RR5 |
| RC8 | Mesh GCR | A mesh STA receiving a group addressed frame subject to a GCR agreement. | Mandatory | Indexed by: <DA, Address 2, sequence number>.<br><br>One cache entry per <DA, Address 2, sequence-number> tuple for each group address subject to a GCR agreement. | RR5 |
| RC9 | QoS Data under BA | A non-DMG QoS STA receiving a QoS Data frame sent under a (#156)block ack agreement | Recommended | None | RR4 |

TABLE OF RECEIVER CACHES

| Receiver cache identifier | Cache name | Applies to | Status | Multiplicity / Cache size | Receiver requirements |
|---|---|---|---|---|---|
| RC10 | DMG Group Addressed | A DMG STA receiving a group addressed frame. | Mandatory | Indexed by: <Address 1, Address 2, sequence number, fragment number> The most recent cache entry per <Address 1, Address 2, sequence-number>. | RR6 |
| RC11 | Individually addressed PV1 Data frame | An S1G STA receiving an individually addressed PV1 Data frame | Mandatory | Indexed by <STA MAC Address identified by Address 2, PTID, sequence number, fragment number>. At least the most recent cache entry per <STA MAC Address identified by Address 2, PTID> pair in this cache. | RR1 |
| RC12 | Individually addressed PV1 Management frame | An S1G STA receiving an individually addressed PV1 Management frame | Mandatory | Indexed by <STA MAC Address identified by Address 2, sequence number, fragment number>. At least the most recent cache entry per <STA MAC Address identified by Address 2> pair in this cache. | RR1 RR2 |

RR1: A receiving non-DMG STA with dot11QMFActivated false or not present and with dot11RobustAVStreamingImplemented false or not present should omit tuples obtained from group addressed frames from this cache.

RR2: A receiving STA should omit tuples obtained from ATIM frames from this cache.

RR3: A receiving QMF STA that is a non-DMG STA with dot11RobustAVStreamingImplemented false or not present shall omit from the cache all tuples obtained from group addressed Data frames.

RR4: For the purposes of duplicate detection using receiver caches, QoS (+)Null frames and, in a non-DMG BSS, QoS Data frames under a (#156)block ack agreement, shall be ignored.

RR5: The STA shall discard the frame if the Retry subfield of the Frame Control field is 1 and it matches an entry in the cache.

RR6: The STA shall discard the frame if it matches an entry in the cache.

FIG. 20 (CONT)

| Receiver cache identifier | Cache name | Applies to | Status | Multiplicity / Cache size | Receiver requirements |
|---|---|---|---|---|---|
| RC6 | QMFs for PV0 | A QMF STA receiving an individually addressed PV0 QMF | Mandatory | Indexed by: <Address 2, AC, sequence number, fragment number><br><br>The most recent cache entry per <Address 2, AC, sequence-number, fragment-number>. | RR2<br>RR3<br>RR5 |
| RC13 | QMF for PV1 | A QMF STA receiving an individually addressed PV1 QMF | Mandatory | Indexed by <STA MAC Address identified by Address 2, AC, sequence number, fragment number><br><br>The most recent cache entry per <STA MAC Address identified by Address 2, AC, sequence-number, fragment-number>. | RR2<br>RR3<br>RR5 |

FIG. 21

```
                                                    ← 2200
┌─────────────────────────────────────────────────────────────┐
│  GENERATE A FRAME THAT INCLUDES A FRAME HEADER, WHEREIN THE │
│  FRAME HEADER INCLUDES A FRAME CONTROL FIELD, WHEREIN THE   │
│  FRAME CONTROL FIELD INCLUDES A PARTIAL TRAFFIC IDENTIFIER  │
│  OR SUBTYPE (PTID/SUBTYPE) SUBFIELD, WHEREIN THE            │
│  PTID/SUBTYPE SUBFIELD INDICATES WHETHER THE FRAME IS A     │
│  QUALITY OF SERVICE (QOS) MANAGEMENT FRAME OR A NON-QOS     │
│                      MANAGEMENT FRAME                       │
│                            2202                             │
│                                                             │
│         IF THE FRAME IS A QOS MANAGEMENT FRAME:             │
│   ┌───────────────────────────────────────────────────────┐ │
│   │ SEQUENCE NUMBER SUBFIELD INCLUDES A FIRST SUBFIELD    │ │
│   │ INDICATING A 10-BIT SEQUENCE NUMBER OF THE FRAME AND  │ │
│   │ A SECOND SUBFIELD INDICATING AN ACCESS CATEGORY OF    │ │
│   │                     THE FRAME                         │ │
│   │                        2204                           │ │
│   └───────────────────────────────────────────────────────┘ │
│                                                             │
│       IF THE FRAME IS A NON-QOS MANAGEMENT FRAME:           │
│   ┌───────────────────────────────────────────────────────┐ │
│   │  SEQUENCE NUMBER SUBFIELD INDICATES A 12-BIT          │ │
│   │          SEQUENCE NUMBER OF THE FRAME                 │ │
│   │                        2206                           │ │
│   └───────────────────────────────────────────────────────┘ │
└─────────────────────────────────────────────────────────────┘
                              │
                              ▼
┌─────────────────────────────────────────────────────────────┐
│           TRANSMIT THE FRAME THROUGH A WIRELESS MEDIUM      │
│                            2208                             │
└─────────────────────────────────────────────────────────────┘
```

FIG. 22

2400

GENERATE A FRAME THAT INCLUDES A HEADER COMPRESSION ELEMENT, WHEREIN THE HEADER COMPRESSION ELEMENT INCLUDES A CTR WITH CBC-MAC PROTOCOL (CCMP) UPDATE FIELD, WHEREIN THE CCMP UPDATE FIELD INCLUDES A FIRST SUBFIELD INDICATING A PARTIAL TRAFFIC IDENTIFIER (PTID) OF QUALITY OF SERVICE (QOS) DATA FRAMES OR AN ACCESS CATEGORY INDEX (ACI) OF QOS MANAGEMENT FRAMES AND A SECOND SUBFIELD INDICATING WHETHER THE FIRST SUBFIELD INDICATES THE PTID OF QOS DATA FRAMES OR NOT
2402

TRANSMIT THE FRAME THROUGH A WIRELESS MEDIUM
2404

FIG. 24

DISTINGUISHING BETWEEN QUALITY OF SERVICE MANAGEMENT FRAMES (QMFS) AND NON-QMFS IN PROTOCOL VERSION 1 (PV1)

CROSS-REFERENCE TO RELATED APPLICATION

This application is a continuation of U.S. patent application Ser. No. 17/389,102, filed Jul. 29, 2021 (now U.S. Pat. No. 11,627,487 issued Apr. 11, 2023), which claims the benefit of U.S. Provisional Patent Application No. 63/059,773, filed Jul. 31, 2020, which are incorporated by reference herein in their entirety.

TECHNICAL FIELD

The present disclosure generally relates to wireless communications, and more specifically, relates to distinguishing between quality of service management frames (QMFs) and non-QMFs in protocol version 1 (PV1).

BACKGROUND

The Institute of Electrical and Electronics Engineers (IEEE) 802.11ah Task Group has developed an amendment to the 802.11 standard targeting Internet of Things (IoT) applications and extended range (ER) applications by defining sub-1-GHz (S1G) license-exempt operations. IoT applications are considered the next major growth area for the wireless industry of home appliances, industrial automation, asset tracking, healthcare, energy management, and wearable devices. Although S1G bands have more limited frequency spectrum available in comparison to than 2.4 and 5 GHz industrial, scientific, and medical (ISM) radio bands, the basic assumption is that the limited frequency spectrum offered by S1G will be sufficient for low data rate applications (e.g. IoT applications) as these applications typically transmit small amounts of data infrequently. Moreover, since the 915 MHz ISM band (e.g., 902-928 MHz) has 8.5 dB less free space propagation loss than the 2.4 GHz ISM band, this could enhance either the link budget between devices or long-range transmission distance in outdoor scenarios. Those properties can help reduce energy consumption of a device by lowering transmit power as well.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3A illustrates components of a wireless device configured to transmit data, in accordance with some embodiments of the present disclosure.

FIG. 3B illustrates components of a wireless device configured to receive data, in accordance with some embodiments of the present disclosure.

FIG. 6 shows characteristics of IEEE 802.11ah, in accordance with some embodiments of the present disclosure.

FIG. 12 shows a table of PV1 management frame subtypes, in accordance with some embodiments of the present disclosure.

FIG. 13 shows a modified/updated table of PV1 management frame subtypes, in accordance with some embodiments of the present disclosure.

FIG. 15 shows a table of UP-to-AC (user priority to access category) mappings, in accordance with some embodiments of the present disclosure.

FIG. 16 shows a table of ACI-to-AC (access category index to access category) coding, in accordance with some embodiments of the present disclosure.

FIG. 17 shows a table of transmitter sequence number spaces, in accordance with some embodiments of the present disclosure.

FIG. 20 shows a table of receiver caches, in accordance with some embodiments of the present disclosure.

FIG. 21 shows a modification/update to the table receiver caches, in accordance with some embodiments of the present disclosure.

FIG. 22 shows a method by a wireless transmitting device for distinguishing between a QoS management frame and a non-QoS management frame, in accordance with an example embodiment of the present disclosure.

FIG. 24 shows a method by a wireless transmitting device for indicating a PTID or an ACI, in accordance with an example embodiment of the present disclosure.

DETAILED DESCRIPTION

Figure 1:
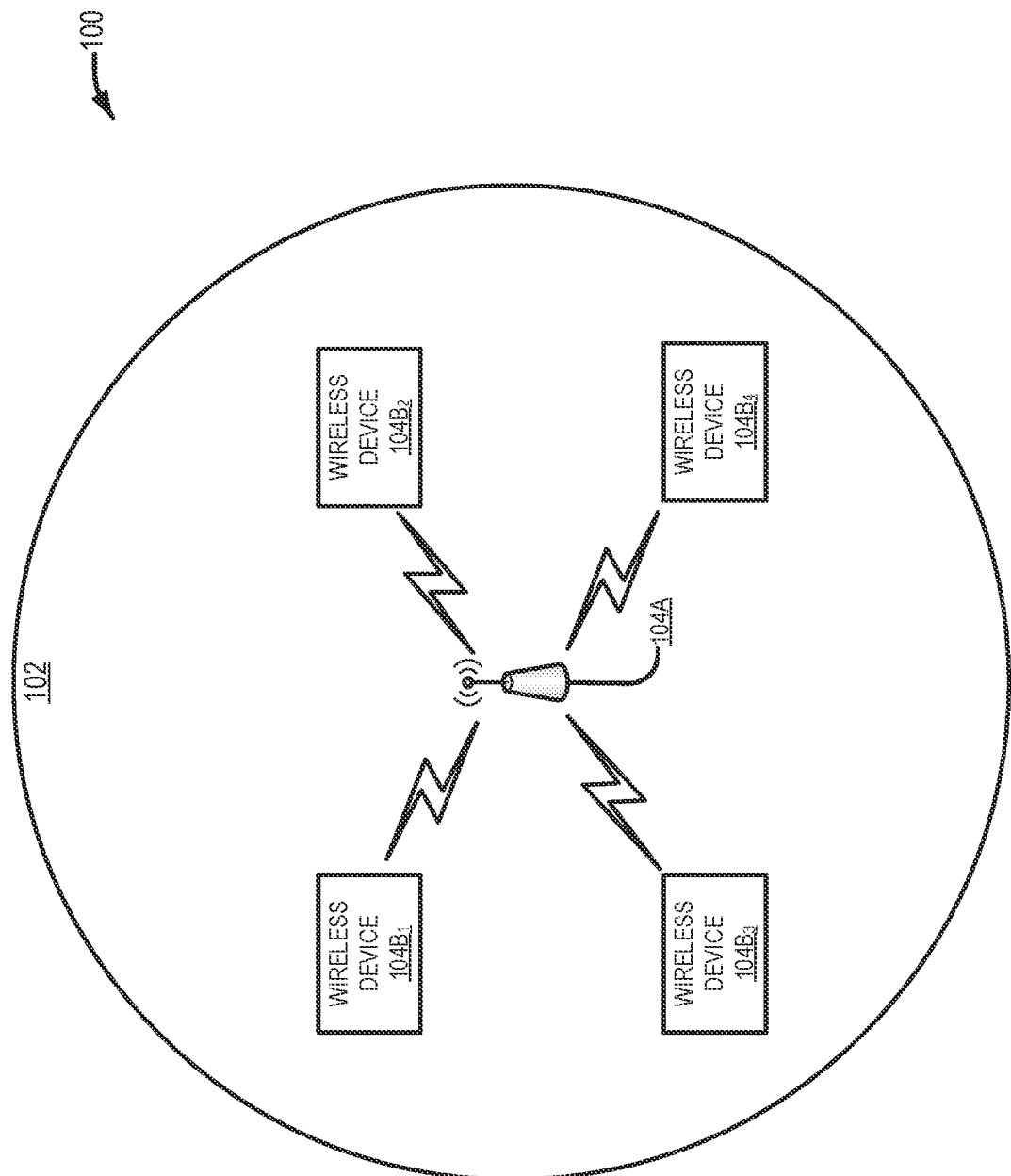
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to distinguishing between quality of service management frames (QMFs) and non-QMFs in protocol version 1 (PV1).

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11. In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate a RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs. Although shown with four non-AP STAs (e.g., the wireless devices 104B$_1$-104B$_4$), the WLAN 100 may include any number of non-AP STAs (e.g., one or more wireless devices 104B).

Figure 2:
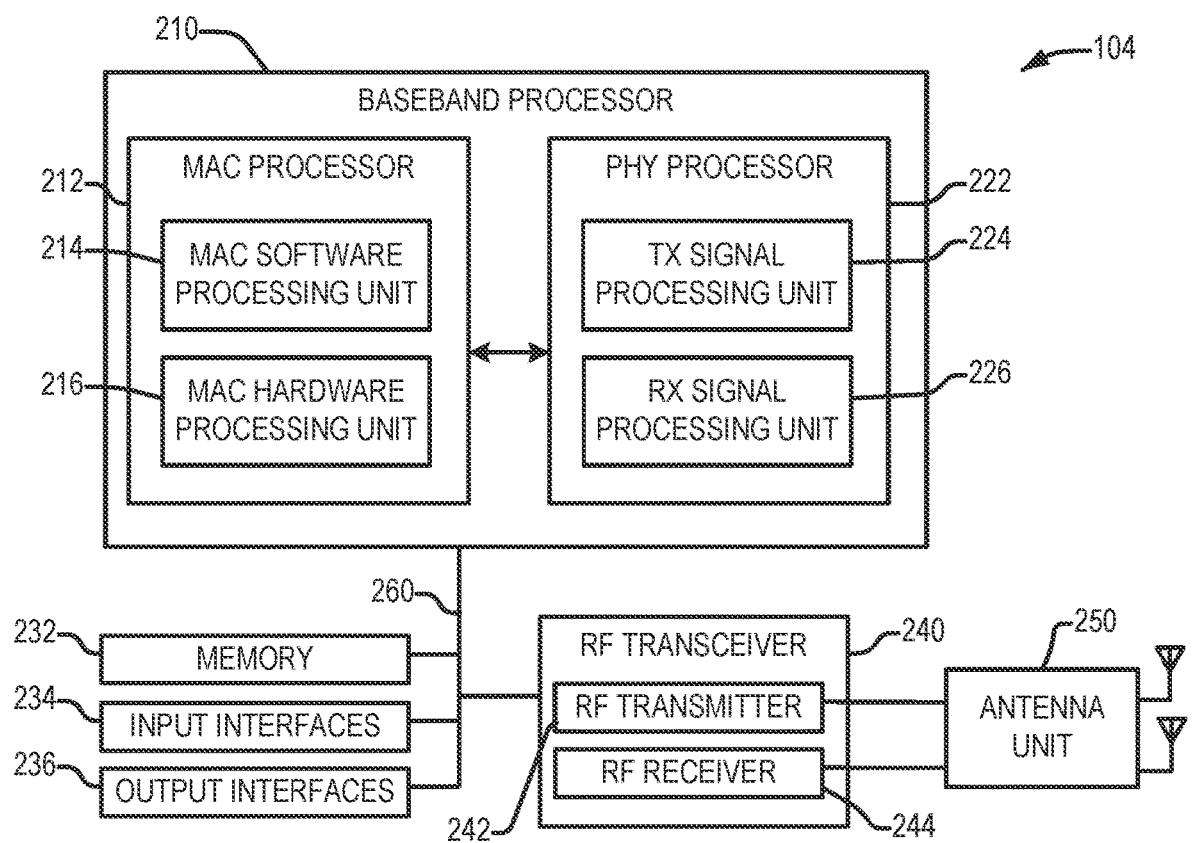
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B$_1$-104B$_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data DATA. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 MHz, 20 MHz, 40 MHz, 80 MHz, and 160 MHz contiguous channel widths and support for an 80+80 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
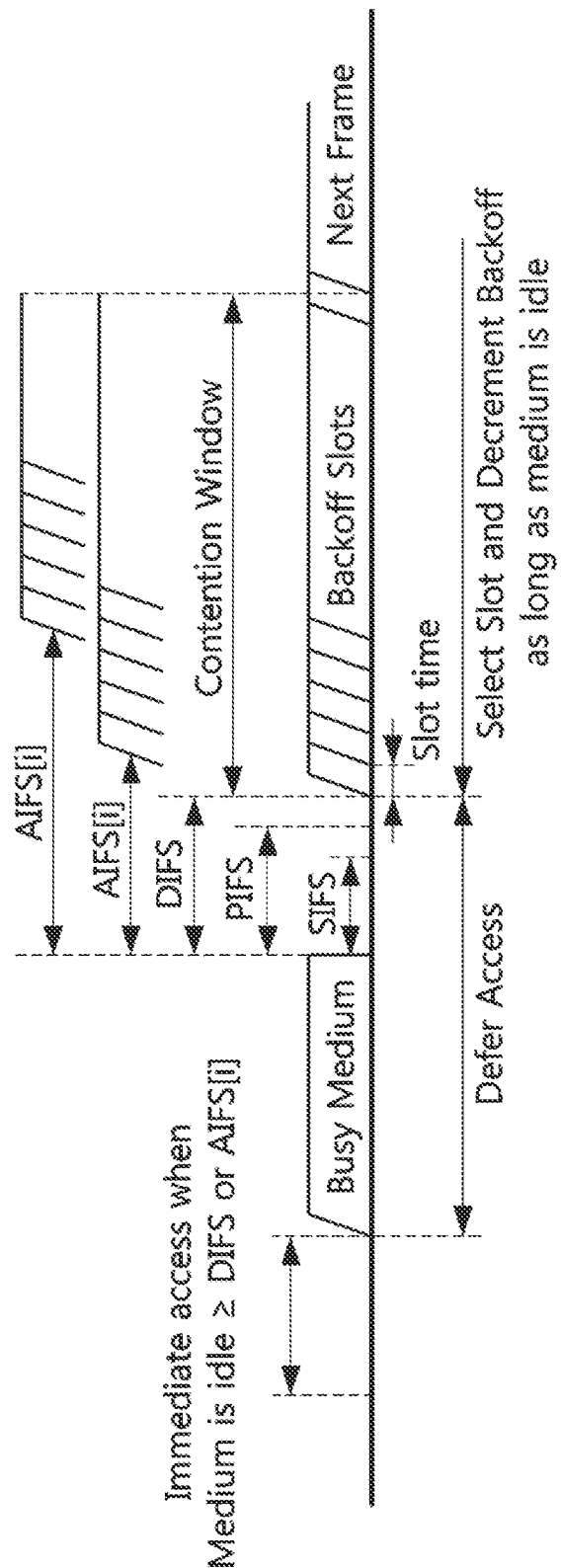
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
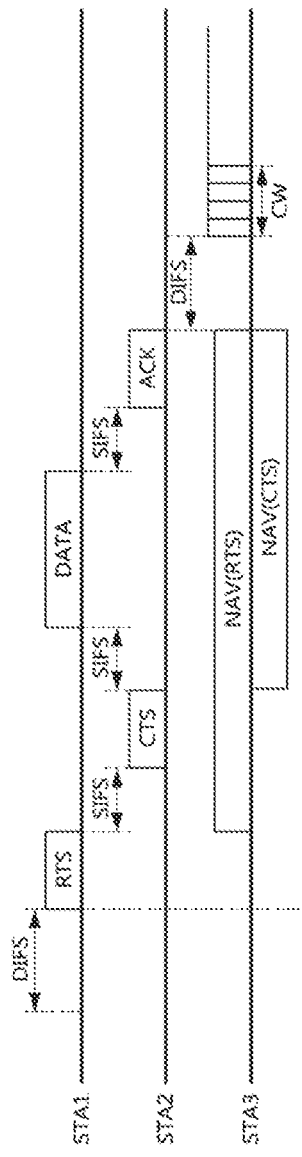
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As noted above, the Institute of Electrical and Electronics Engineers (IEEE) 802.11ah Task Group is developing an amendment to the IEEE 802.11 standard. This amendment (sometimes referred to as IEEE 802.11ah) defines a wireless networking protocol with a number of characteristics, including those described in the table shown in FIG. 6.

Figure 7:
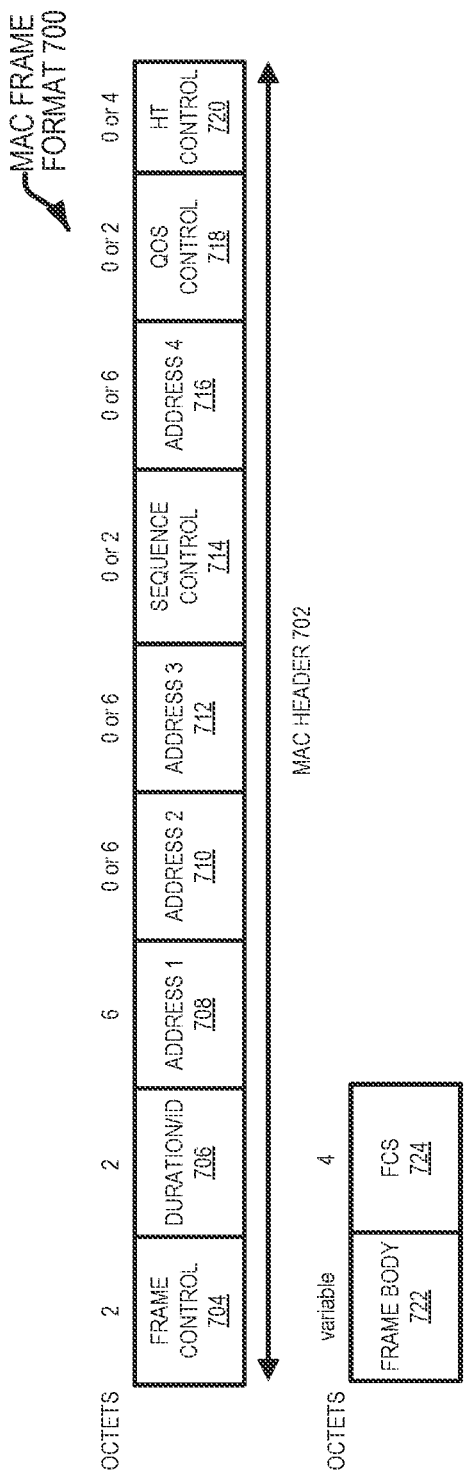
FIG. 7 shows, shows a general MAC frame format for protocol version 0 (PV0) MAC protocol data units (MPDUs), in accordance with some embodiments of the present disclosure.
Figure 8:
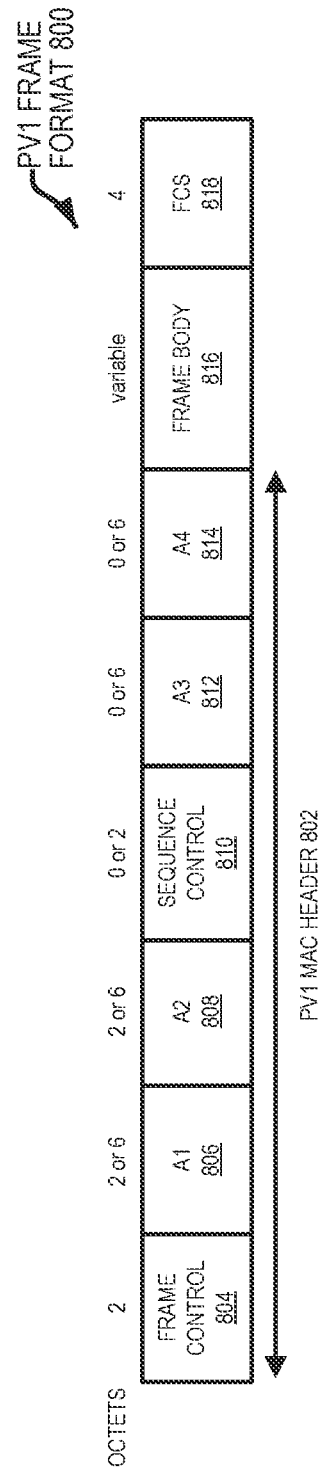
FIG. 8 shows the general MAC frame format for protocol version 1 (PV1) frames, in accordance with some embodiments of the present disclosure.

The medium access control (MAC) frame format comprises a set of fields that occur in a fixed order in all frames. FIG. 7 shows a general MAC frame format 700 for protocol version 0 (PV0) MAC protocol data units (MPDUs) according to some example embodiments. As shown in FIG. 7, the MAC frame includes a MAC header 702, a Frame Body 722, and a Frame Check Sequence (FCS) field 724. The MAC header 702 includes a Frame Control field 704, a Duration/ID field 706, an Address 1 field 708, an Address 2 field 710, an Address 3 field 712, a Sequence Control field 714, an Address 4 field 716, a QoS Control field 718, and an HT Control field 720. FIG. 8 shows the general MAC frame format 800 for protocol version 1 (PV1) frames according to some example embodiments. As shown in the diagram, the PV1 frame includes a PV1 MAC header 802, a Frame Body 816, and a FCS field 818. The PV1 MAC header 802 includes a Frame Control Field 804, an A1 field 806, an A2 field 808, a Sequence Control field 810, an A3 field 812, and an A4 field 814. The first two bits of the first subfield (Protocol Version subfield) of the Frame Control field (M101) and the last field (FCS field) in FIG. 7 are present in PV0 MPDUs and PV1 MPDUs, including reserved types and subtypes.

Figure 9:
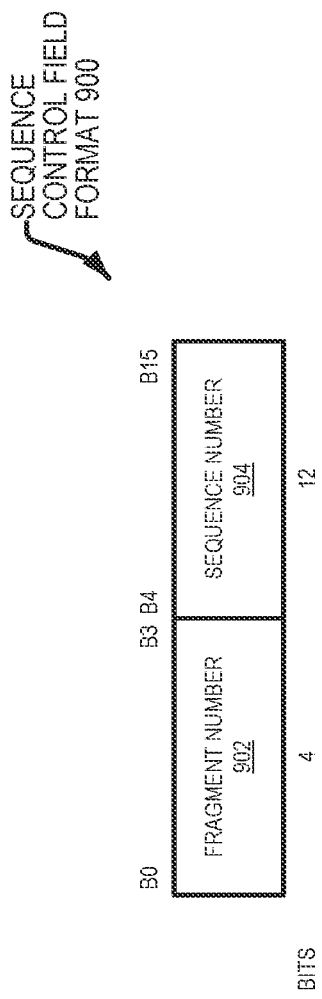
FIG. 9 shows a format of the Sequence Control field, in accordance with some embodiments of the present disclosure.

The Sequence Control field 714, 810 may consist of two subfields—a Sequence Number subfield and a Fragment Number subfield. An example format of the Sequence Control field 900 is shown in FIG. 9. As shown in FIG. 9, the Sequence Control field includes a 4-bit Fragment Number subfield 902 and a 12-bit Sequence Number subfield 904.

Figure 10:
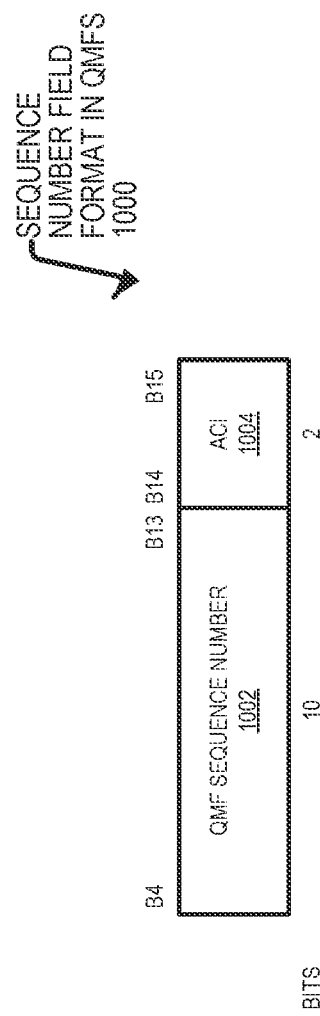
FIG. 10 shows a format of the Sequence Number subfield in quality of service management frames (QMFs), in accordance with some embodiments of the present disclosure.

The Sequence Number subfield 904 in quality of service management frames (QMFs) includes a QMF Sequence Number subfield and an Access Category Index (ACI) subfield. An example format of the Sequence Number subfield in QMFs 1000 is shown in FIG. 10. As shown in FIG. 10, the Sequence Number subfield includes a 10-bit QMF Sequence Number subfield 1002 (which occupies bits B4-B13 of the sequence control field) and a 2-bit ACI subfield 1004 (which occupies bits B14 and B15 of the sequence control field). The QMF Sequence Number subfield 1002 may indicate the sequence number of the frame. The ACI subfield 1004 may indicate the ACI of the frame.

The Sequence Number subfield 904 in management frames that are not QMFs may be a 12-bit subfield indicating the sequence number of the frame.

Although the Institute of Electrical and Electronics Engineers (IEEE) 802.11ah specification has been officially published, some of the descriptions therein are ambiguous, and this may cause the readers and developers to be confused. For example, in the current IEEE 802.11ah specification, QMF and non-QMF is not clearly and precisely defined for PV1 frames.

Figure 11:
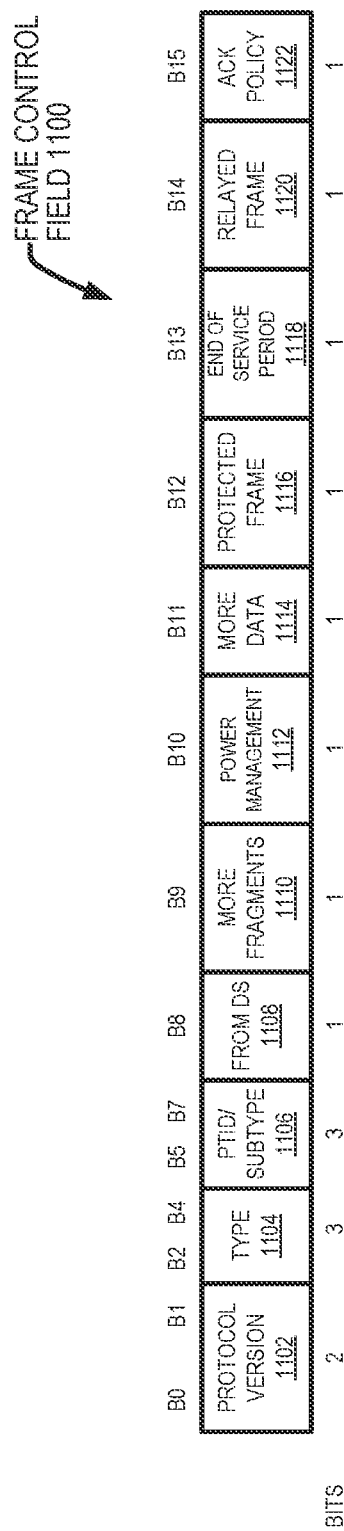
FIG. 11 shows a Frame Control field of general PV1 management frames, in accordance with some embodiments of the present disclosure.

QMF is typically distinguished from non-QMFs using the To DS (to distribution system) subfield in PV0 format, but there is no To DS subfield in the PV1 management frame. FIG. 11 shows an example of the Frame Control field 1100 of general PV1 management frames. As shown in FIG. 11, the Frame Control field 1100 includes a Protocol Version subfield 1102, a Type subfield 1104, a PTID/Subtype subfield 1106, a From DS subfield 1108, a More Fragments subfield 1110, a Power Management subfield 1112, a More Data subfield 1114, a Protected Frame subfield 1116, an End of Service Period subfield 1118, a Relayed Frame subfield 1120, and an Ack Policy subfield 1122. It should be noted that this Frame Control field 1100 does not include a To DS subfield.

For the purpose of reducing the entire MPDU size, the header of PV1 frames may be compressed by eliminating some subfields. A receiver that receives a PV1 management frame without the To DS subfield is not able to distinguish whether the management frame is a QMF or a non-QMF. If the receiver assumes that the received management frame is a QMF, the receiver may interpret the Sequence Control field as including a 10-bit Sequence Number subfield and a 2-bit ACI subfield (e.g., as shown in FIG. 10). In another case, if the receiver assumes that the received management frame is a non-QMF, the receiver may interpret the Sequence Control field as including a 12-bit Sequence Number subfield. To avoid ambiguity in interpreting received frame fields, there is a need for a mechanism to be able to distinguish between QMFs and non-QMFs in PV1.

In the current IEEE 802.11ah specification, sub-1-GHz (S1G) station (STA) cannot fully support QMF in PV1 frame. Embodiments allow S1G STAs to support QMF in PV1 frames. PV1 management frames may include a Subtype subfield in the Frame Control field to indicate a subtype, where the subtypes are indicated as shown in FIG. 12.

As shown in FIG. 12, there are subtype values that are reserved (e.g., binary values '100'-'111' are reserved). Embodiments may use the reserved values of the PTID/Subtype subfield 1106 for indicating whether the PV1 management frame is a QMF or non-QMF as shown in FIG. 13, as one example. As shown in FIG. 13, PTID/Subtype value of binary '000' indicates Action (non-QMF) and PTID/Subtype value of binary '001' indicates Action No Ack (non-QMF). Also, PTID/Subtype value of binary '100' indicates Action (QMF) and PTID/Subtype value of binary '101' indicates Action No Ack (QMF). Thus, PTID/Subtype values of binary '000' and '001' indicate that the frame is a QMF while the PTID/Subtype values of binary '100' and '101' indicate that the frame is a non-QMF. The tables shown in FIG. 12 and FIG. 13 indicate specific bit positions for the subtype value (i.e., B7, B6, and B5 of the Frame Control field 1100). It should be understood, however, that other bit positions are possible.

This new interpretation of the PTID/Subtype subfield 1106 makes it possible for the transmitter and receiver of a PV1 management frame to be able to indicate/determine whether the frame is a QMF or non-QMF. While FIG. 13 shows particular values being used to indicate Action (QMF) and Action No Ack (QMF), other values (e.g., any of the reserved values such as binary '100' to '111') could be used to indicate Action (QMF) and Acton No Ack (QMF).

Figure 14:
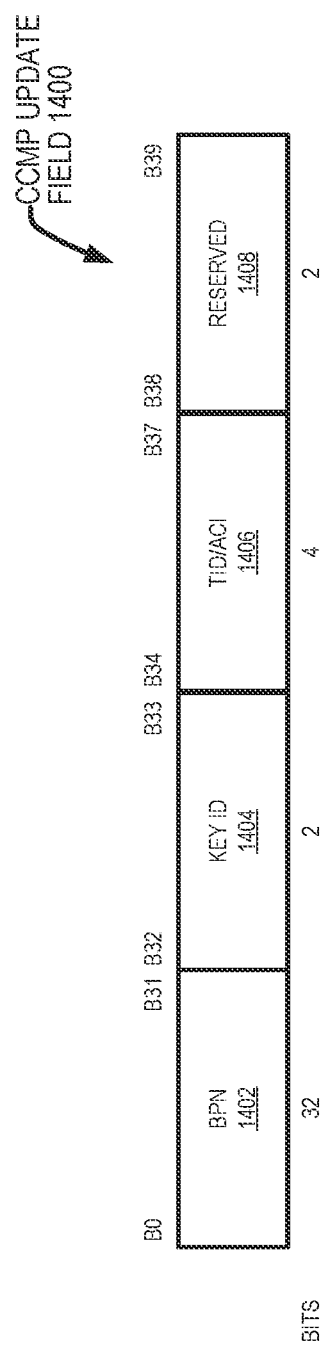
FIG. 14 shows a CCMP Update field, in accordance with some embodiments of the present disclosure.

In addition to the problems mentioned above, the PV1 header compression also has not been clearly described in the IEEE 802.11ah specification. A PV1 frame does not include a cipher header for encryption and decryption. Instead of the cipher header, a PV1 frame uses other parameters from the compressed header and uses a Base Packet Number (BPN) and Key ID, which is stored and managed locally. BPN is used in the nonce value of CCMP (CTR with CBC-MAC protocol) as the part of PN (Packet Number). A STA receiving a PV1 frame decides whether the sequence number was wrap-around or not, and it increases the BPN in case that the sequence number wraps around. The BPN is stored locally and configured by TID/ACI (traffic identifier/access category index) value by using the header compression frame. FIG. 14 shows an example of the CCMP Update field 1400 in the Header Compression Element. As shown in FIG. 14, the CCMP Update field 1400 includes a BPN subfield 1402, a Key ID subfield 1404, a TID/ACI subfield 1406, and a Reserved subfield 1408.

A STA can request and response the update of BPN and Key ID with a header compression action frame. The TID/ACI subfield 1406 indicates which information is to be updated in the peer STA. TID is used for data frames and ACI is used for management frames. However, in the header compression frame (e.g., an action frame or association request/response frame that includes a "Header Compression Element"), there is no proper indication of whether the incoming CCMP Update field 1400 corresponds to a data frame or a management frame. Because of this, the STA might share the same BPN and Key ID between data frames and management frames without holding an indication described above.

As a result, the existing mechanism has the following potential problems. First, the same value of TID/ACI between data frame and management frame indicates different access category (so it is ambiguous which access category is intended). Second, both data frame and management frame having the same value of TID and ACI use the same sequence number space identifiers.

FIGS. 15 and 16 show mapping tables of TID to access category and ACI to access category, respectively, according to some example embodiments (all references therein are to the IEEE 802.11ah standard). For example, as shown in FIG. 16, ACI value of '3' indicates "AC_VO" (voice) access category, but as shown in FIG. 15, TID value (or "UP" (user priority) value in this example—TID values 0 to 7 are interpreted as UP) of '3' indicates "AC_BE" (best effort) access category. Therefore, TID/ACI of data frame and management frame point to different access category and different sequence number space (SNS) in the transmitter sequence number spaces table shown in FIG. 17, and the BPN is updated and shared in each of the different sequence number spaces.

For the access category (AC) of management frames, QoS STA that transmits a management frame may determine access category used for medium access in transmission of the management frame as follows:
  If dot11QMFActivated is false or not present
    If the Management frame is individually addressed to a non-QoS STA, category AC_BE should be selected (NOTE—Category AC_BE might not be selected when no prior Data frames have been transmitted to the non-QoS STA)
    If category AC_BE was not selected by the previous step, category AC_VO shall be selected (NOTE—Selection of AC_VO above is independent of whether the STA is associated with a BSS, or whether there is a QoS facility in the BSS)
  If dot11QMFActivated is true the STA determines the access category as defined in QMF rule (NOTE—Category AC_VO is selected when PV1 management frame is transmitted)

A transmitting STA may support the applicable sequence number spaces defined in the transmitter sequence number spaces table shown in FIG. 17 (all references therein are to the IEEE 802.11ah standard). Applicability is defined by the "Applies to" column. The "Status" column indicates the level of support that is required if the "Applies to" column matches the transmission. The "Multiplicity" column indicates whether the sequence number space contains a single counter or multiple counters, and in the latter case identifies any indexes. The "Transmitter requirements" column identifies requirements for the operation of this sequence number space. The referenced requirements are defined at the bottom of the table.

FIG. 17 shows the transmitter sequence number spaces. When the STA uses enhanced distributed channel access (EDCA) mechanism, the sequence numbers may be managed by STA address and partial TID (PTID) in the PV1 data frame with SNS6, and those may be managed by STA address in the PV1 management frame with SNS7. The sequence number may be independently used between data frame and management frame.

To resolve the two potential problems mentioned above, embodiments may revise the TID/ACI subfield as described herein below.

Figures 18, 19:
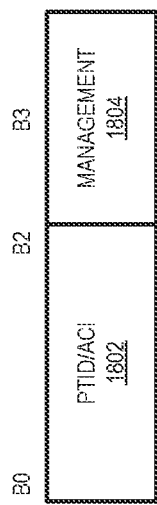
FIG. 18 shows a PTID/ACI (partial traffic identifier/access category index) subfield and a Management subfield, in accordance with some embodiments of the present disclosure.
FIG. 19 shows a modification/update to the table of transmitter sequence number spaces, in accordance with some embodiments of the present disclosure.

In one embodiment, the 4-bit TID/ACI subfield used in CCMP Update field format shown in FIG. 14 is modified/replaced with two subfields as shown in FIG. 18. FIG. 18 shows a PTID/ACI subfield 1802 and a Management subfield 1804, wherein the bits B0 to B3 may correspond to bits B34 to B37 of the CCMP Update field. The exact positions and the name of the two subfields (e.g., three bits for the PTID/ACI subfield 1802 and one bit for the Management subfield 1804) could be different depending on the embodiment while keeping with the same concept.

In one embodiment, the TID/ACI subfield is replaced with two subfields, which includes a first subfield and a second subfield, wherein the first subfield indicates the values corresponding to PTID or ACI and the second subfield indicates whether the first subfield indicates PTID or not. Given that PTID information is three bits and ACI information is two bits, in one embodiment, when ACI is indicated in the first subfield, one bit in that subfield can be reserved. The reserved bit could be defined as binary '0' or '1'.

In one embodiment, the first subfield and the second subfield can be defined as shown in FIG. 18 (where the PTID/ACI subfield 1802 corresponds to the aforementioned first subfield and the Management subfield 1804 corresponds to the aforementioned second subfield) and as described below.

PTID: The 3 LSBs (least significant bits) of the TID for PV1 QoS data frames.

ACI: The access category index of PV1 Management frames. Bit B2 is reserved (e.g. and set to binary '1'.)

Management: A flag indicating whether the PTID/ACI subfield indicates PTID or ACI. If it is set to binary '1', the PTID/ACI subfield indicates PTID, otherwise, it indicates ACI.

Furthermore, to fully support QMF operation for PV1, the table of transmitter sequence number spaces and the table of receiver caches (from current IEEE 802.11ah specification) can be modified and updated as described in FIG. 19. The exact SNS identifier number could be differently defined than shown in the diagram.

The SNS4 row may be modified for only PV0 and SNS8 row may be updated/added into the table of transmitter sequence number spaces (e.g., the table shown in FIG. 17) as shown in FIG. 19.

In one embodiment, it is required that a receiving STA implement the applicable receiver requirements shown in FIG. 20 with "Status" indicated as "Mandatory" (all references therein are to the IEEE 802.11ah standard). In one embodiment, it is recommended that a receiving STA implement the applicable receiver requirements shown in FIG. 20 with "Status" indicated as "Recommended". In one embodiment, it is optional for a receiving STA to implement the applicable receiver requirements shown in FIG. 20 with "Status" indicated as "Optional". Applicability is defined by the "Applies to" column. The "Status" column indicates the level of support that is required if the "Applies to" column matches the received frame. The "Multiplicity/Cache size" column indicates the indexes that identify a cache entry and the number of entries that shall be supported. The "Receiver requirements" column identifies requirements for the operation of this cache. The referenced requirements are defined at the end of the table. The requirements relate to caching information that identifies a cache entry and discarding duplicate MPDUs.

In one embodiment, RC6 row is modified for PV0 and RC13 row is updated into the table of receiver caches (e.g., the table shown in FIG. 20) as shown in FIG. 21. The exact RC identifier number could be differently defined.

With this modification, QMF for PV1 can maintain adequate sequence number, so BPN and Key ID can be trackable without losing precision.

Turning now to FIG. 22, a method 2200 will be described for distinguishing between a QoS management frame and a non-QoS management frame, in accordance with an example embodiment. The method 2200 may be performed by one or more devices described herein. For example, the method 2200 may be performed by a WLAN device 104. Additionally, although shown in a particular order, in some embodiments the operations of the method 2200 may be performed in a different order. For example, although the operations of the method 2200 are shown in a sequential order, some of the operations may be performed in partially or entirely overlapping time periods.

As shown in FIG. 22, the method 2200 may commence at operation 2202 with a wireless transmitting device (e.g., a WLAN device 104) generating a frame that includes a frame header, wherein the frame header includes a frame control field, wherein the frame control field includes a PTID/subtype subfield, wherein the PTID/subtype subfield indicates whether the frame is a QoS management frame or a non-QoS management frame. In one embodiment, the PTID/subtype subfield occupies bits B5 to B7 of the frame control field. In one embodiment, a value included in the PTID/subtype subfield being set to binary '100' or binary '101' indicates that the frame is a QoS management frame. In one embodiment, a value included in the PTID/subtype subfield being set to binary '000' or binary '001' indicates that the frame is a non-QoS management frame. In one embodiment, the frame is a PV1 frame, wherein the frame control field does not include a To DS subfield.

The frame header may further include a sequence control field, wherein the sequence control field includes a sequence number subfield. In one embodiment, as shown by block 2204, when the PTID/subtype subfield indicates that the frame is a QoS management frame, the sequence number subfield includes a first subfield indicating a 10-bit sequence number of the frame and a second subfield indicating an ACI of the frame. In one embodiment, the first subfield occupies bits B4 to B13 of the sequence control field and the second subfield occupies bits B14 and B15 of the sequence control field. In one embodiment, as shown by block 2206, when the PTID/subtype subfield indicates that the frame is a non-QoS management frame, the sequence number subfield indicates a 12-bit sequence number of the frame.

At operation 2208, the wireless transmitting device transmits the frame through a wireless medium.

Figure 23:
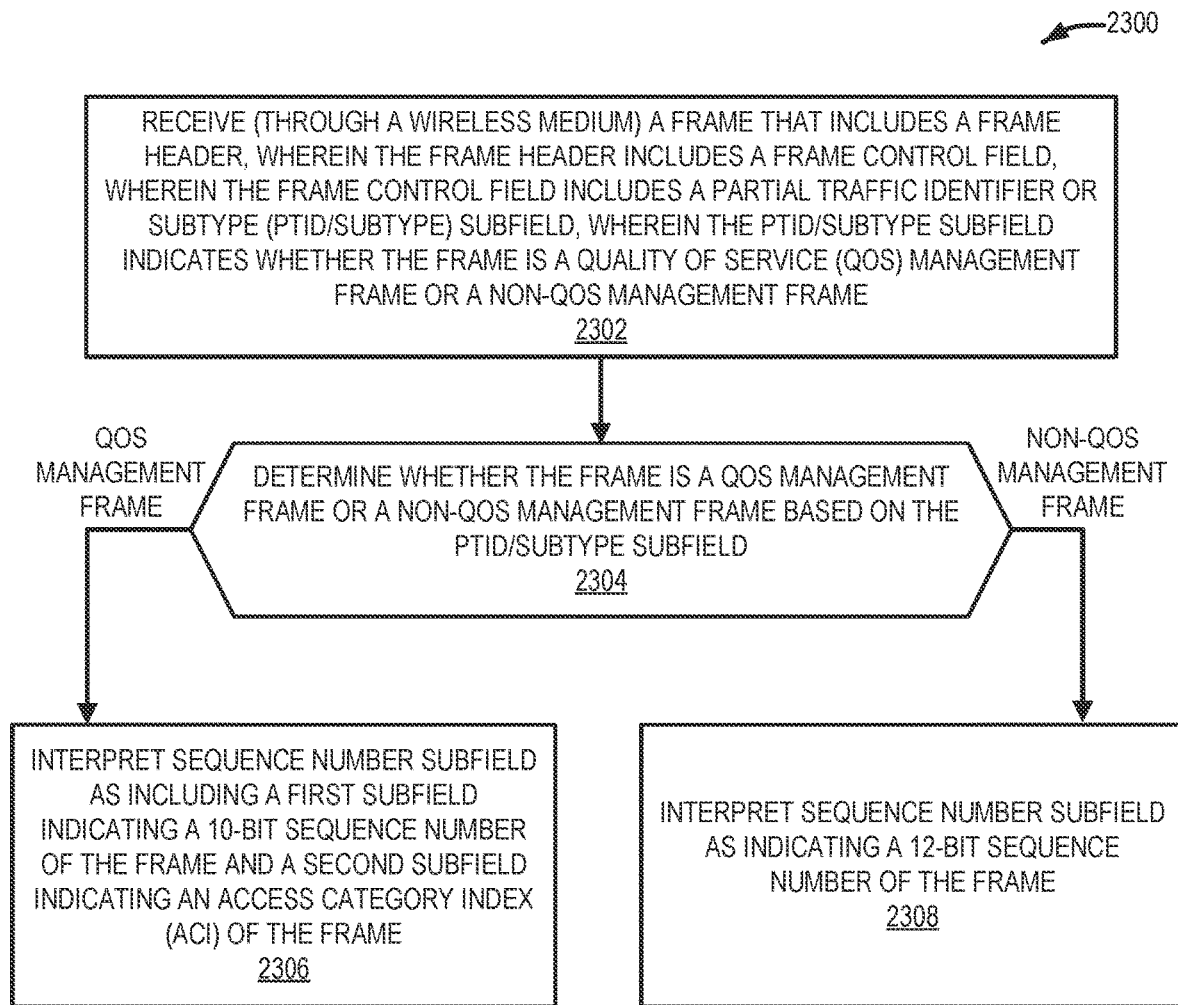
FIG. 23 shows a method by a wireless receiving device for distinguishing between a QoS management frame and a non-QoS management frame, in accordance with an example embodiment of the present disclosure.

Turning now to FIG. 23, a method 2300 will be described for distinguishing between a QoS management frame and a non-QoS management frame, in accordance with an example embodiment. The method 2300 may be performed by one or more devices described herein. For example, the method 2300 may be performed by a WLAN device 104. Additionally, although shown in a particular order, in some embodiments the operations of the method 2300 may be performed in a different order. For example, although the operations of the method 2300 are shown in a sequential order, some of the operations may be performed in partially or entirely overlapping time periods.

As shown in FIG. 23, the method 2300 may commence at operation 2302 with a wireless receiving device (e.g., a WLAN device 104) receiving (through a wireless medium) a frame that includes a frame header, wherein the frame header includes a frame control field, wherein the frame control field includes a PTID/subtype subfield, wherein the PTID/subtype subfield indicates whether the frame is a QoS management frame or a non-QoS management frame. In one embodiment, the PTID/subtype subfield occupies bits B5 to B7 of the frame control field.

At operation 2304, the wireless receiving device determines whether the frame is a QoS management frame or a non-QoS management frame based on the PTID/subtype subfield. In one embodiment, the frame is determined to be a QoS management frame if the PTID/subtype subfield includes a value of binary '100' or binary '101'. In one embodiment, the frame is determined to be a non-QoS management frame if the PTID/subtype subfield includes a value of binary '000' or binary '001'. In one embodiment, the frame is a PV1 frame, wherein the frame control field does not include a To DS subfield.

The frame header may further include a sequence control field, wherein the sequence control field includes a sequence number subfield. If the wireless receiving device determines that the frame is a QoS management frame, then at operation 2306, the wireless receiving device interprets the sequence number subfield as including a first subfield indicating a 10-bit sequence number of the frame and a second subfield indicating an ACI of the frame. In one embodiment, the first subfield occupies bits B4 to B13 of the sequence control field and the second subfield occupies bits B14 and B15 of the sequence control field.

Otherwise, if the wireless receiving device determines that the frame is a non-QoS management frame, then at operation 2308, the wireless receiving device interprets the sequence number subfield as indicating a 12-bit sequence number of the frame.

Turning now to FIG. 24, a method 2400 will be described for indicating a PTID or an ACI in a header compression element, in accordance with an example embodiment. The method 2400 may be performed by one or more devices described herein. For example, the method 2400 may be performed by a WLAN device 104. Additionally, although shown in a particular order, in some embodiments the operations of the method 2400 may be performed in a different order. For example, although the operations of the method 2400 are shown in a sequential order, some of the operations may be performed in partially or entirely overlapping time periods.

As shown in FIG. 24, the method 2400 may commence at operation 2402 with a wireless transmitting device (e.g., a WLAN device 104 such as an AP STA) generating a frame that includes a header compression element, wherein the header compression element includes a CCMP update field, wherein the CCMP update field includes a first subfield indicating a PTID of QoS data frames or an ACI of QoS management frames and a second subfield indicating whether the first subfield indicates the PTID of QoS data frames or not. In one embodiment, the PTID of QoS data frames corresponds to the three least significant bits of a TID of QoS data frames. In one embodiment, when the second subfield indicates that the first subfield does not indicate the PTID of QoS data frames, the first subfield indicates the ACI of QoS management frames, wherein the first subfield includes two bits to indicate the ACI of QoS management frames and one reserved bit. In one embodiment, the first subfield occupies bits B34 to B36 of the CCMP update field and the second subfield occupies bit B37 of the CCMP update field. While an embodiment where the CCMP update field is used to indicate PTID or ACI is described above, other embodiments may use a different field in the header compression element to indicate PTID or ACI.

At operation 2404, the wireless transmitting device transmits the frame through a wireless medium.

Figure 25:
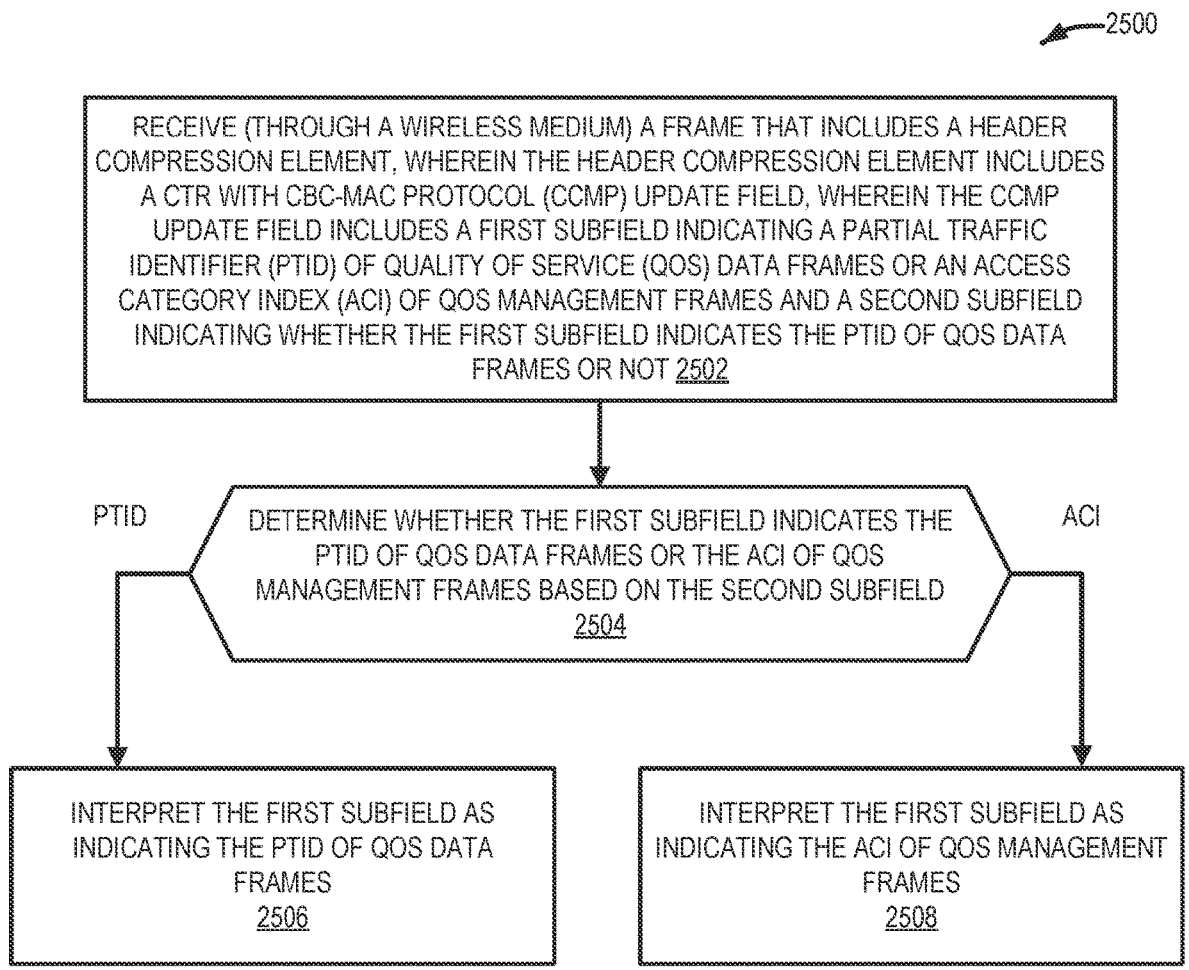
FIG. 25 shows a method by a wireless receiving device for determining a PTID or an ACI, in accordance with an example embodiment of the present disclosure.

Turning now to FIG. 25, a method 2500 will be described for determining a PTID or an ACI from a header compression element, in accordance with an example embodiment. The method 2500 may be performed by one or more devices described herein. For example, the method 2500 may be performed by a WLAN device 104. Additionally, although shown in a particular order, in some embodiments the operations of the method 2500 may be performed in a different order. For example, although the operations of the method 2500 are shown in a sequential order, some of the operations may be performed in partially or entirely overlapping time periods.

As shown in FIG. 25, the method 2500 may commence at operation 2502 with a wireless receiving device (e.g., a WLAN device 104 such as a non-AP STA) receiving (through a wireless medium) a frame that includes a header compression element, wherein the header compression element includes a CCMP update field, wherein the CCMP update field includes a first subfield indicating a PTID of QoS data frames or an ACI of QoS management frames and a second subfield indicating whether the first subfield indicates the PTID of QoS data frames or not. In one embodiment, the PTID of QoS data frames corresponds to the three least significant bits of a TID of QoS data frames. In one embodiment, the first subfield occupies bits B34 to B36 of the CCMP update field and the second subfield occupies bit B37 of the CCMP update field. While an embodiment where the CCMP update field is used to indicate PTID or ACI is described above, other embodiments may use a different field in the header compression element to indicate PTID or ACI.

At operation 2504, the wireless receiving device determines whether the first subfield indicates the PTID of QoS data frames or the ACI of QoS management frames based on the second subfield.

If the wireless receiving device determines that the first subfield indicates the PTID of QoS data frames, then at operation 2506, the wireless receiving device interprets the first subfield as indicating the PTID of QoS data frames.

Otherwise, if the wireless receiving device determines that the first subfield indicates the ACI of QoS management frames, then at operation 2308, the wireless receiving device interprets the first subfield as indicating the ACI of QoS management frames. In one embodiment, when the second subfield indicates that the first subfield does not indicate the PTID of QoS data frames, the first subfield indicates the ACI of QoS management frames, wherein the first subfield includes two bits to indicate the ACI of QoS management frames and one reserved bit.

In one embodiment, the methods 2400 and/or 2500 can be performed in addition to the methods 2200 and/or 2300. For example, a WLAN device 104 may perform methods 2200 and/or 2300 to distinguish between QMFs and non-QMFs and also perform methods 2400 and/or 2500 to indicate/determine a PTID or an ACI.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method by a wireless transmitting device for indicating a partial traffic identifier (PTID) or an access category index (ACI) in a header compression element, the method comprising:
generating a frame that includes the header compression element, wherein the header compression element includes a counter mode with cipher block chaining message authentication code protocol (CCMP) update field that includes a first subfield that is for indicating a PTID of a quality of service (QoS) data frame or an ACI of a QoS management frame and a second subfield indicating whether the first subfield indicates the PTID of the QoS data frame or the ACI of the QoS management frame, wherein the first subfield and the second subfield occupy bits B34 to B37 of the CCMP update field; and
transmitting the frame through a wireless medium.

2. The method of claim 1, wherein when the second subfield indicates that the first subfield indicates the PTID of the QoS data frame, the first subfield includes three bits that indicate the PTID of the QoS data frame.

3. The method of claim 2, wherein when the second subfield indicates that the first subfield indicates the ACI of the QoS management frame, the first subfield includes two bits that indicate the ACI of the QoS management frame and one reserved bit.

4. The method of claim 3, wherein the one reserved bit is set to '1'.

5. The method of claim 4, wherein the second subfield being set to '1' indicates that the first subfield indicates the PTID of the QoS data frame.

6. The method of claim 1, wherein the wireless transmitting device supports separate sequence number spaces for Protocol Version 0 (PV0) QoS management frames and Protocol Version 1 (PV1) QoS management frames.

7. The method of claim 6, wherein the sequence number space for PV1 QoS management frames is indexed based on media access control (MAC) address and access category.

8. A method by a wireless receiving device for determining a partial traffic identifier (PTID) or an access category index (ACI) from a header compression element, the method comprising:
receiving, through a wireless medium, a frame that includes the header compression element, wherein the header compression element includes a counter mode with cipher block chaining message authentication code protocol (CCMP) update field that includes a first subfield that is for indicating a PTID of a quality of service (QoS) data frame or an ACI of a QoS management frame and a second subfield indicating whether the first subfield indicates the PTID of the QoS data frame or the ACI of the QoS management frame, wherein the first subfield and the second subfield occupy bits B34 to B37 of the CCMP update field; and
determining whether the first subfield indicates the PTID of the QoS data frame or the ACI of the QoS management frame based on the second subfield.

9. The method of claim 8, further comprising:
interpreting the first subfield as indicating the PTID of the QoS data frame in response to determining, based on the second subfield, that the first subfield indicates the PTID of the QoS data frame.

10. The method of claim 9, wherein the first subfield is interpreted as including three bits that indicate the PTID of the QoS data frame.

11. The method of claim 8, further comprising:
interpreting the first subfield as indicating the ACI of the QoS management frame in response to determining, based on the second subfield, that the first subfield indicates the ACI of the QoS management frame.

12. The method of claim 11, wherein the first subfield is interpreted as including two bits that indicate the ACI of the QoS management frame and one reserved bit.

13. The method of claim 12, wherein the one reserved bit is set to '1'.

14. The method of claim 8, wherein the first subfield occupies bits B34 to B36 of the CCMP update field and the second subfield occupies bit B37 of the CCMP update field.

15. The method of claim 8, wherein the wireless receiving device implements separate receiver caches for Protocol Version 0 (PV0) QoS management frames and Protocol Version 1 (PV1) QoS management frames.

16. The method of claim 15, wherein entries of the receiver cache for PV1 QoS management frames are identified based on media access control (MAC) address, access category, sequence number, and fragment number.

17. A wireless device comprising:
a radio frequency (RF) transceiver;

a memory storing therein a set of instructions; and
a processor coupled to the memory, wherein the set of instruction, when executed by the processor, causes the wireless device to:
  generate a frame that includes a header compression element, wherein the header compression element includes a counter mode with cipher block chaining message authentication code protocol (CCMP) update field that includes a first subfield that is for indicating a partial traffic identifier (PTID) of a quality of service (QoS) data frame or an ACI of a QoS management frame and a second subfield indicating whether the first subfield indicates the PTID of the QoS data frame or the ACI of the QoS management frame, wherein the first subfield and the second subfield occupy bits B34 to B37 of the CCMP update field; and
  transmit, via the RF transceiver, the frame through a wireless medium.

18. The wireless device of claim 17, wherein when the second subfield indicates that the first subfield indicates the PTID of the QoS data frame, the first subfield includes three bits that indicate the PTID of the QoS data frame.

19. The wireless device of claim 18, wherein when the second subfield indicates that the first subfield indicates the ACI of the QoS management frame, the first subfield includes two bits that indicate the ACI of the QoS management frame and one reserved bit wherein the one reserved bit is set to '1'.

* * * * *